(12) United States Patent
Liu et al.

(10) Patent No.: US 12,466,235 B2
(45) Date of Patent: Nov. 11, 2025

(54) AIR INTAKE SYSTEM, AND HEATING AND VENTILATION AIR CONDITIONER AND VEHICLE COMPRISING SAME

(71) Applicant: VALEO SYSTEMES THERMIQUES, Lemesnil Saint Denis (FR)

(72) Inventors: Linbo Liu, Hubei (CN); Ming Zhou, Hubei (CN); Xianyang Zou, Hubei (CN)

(73) Assignee: VALEO SYSTEMES THERMIQUES, Le Mesnil Saint Denis (FR)

(*) Notice: Subject to any disclaimer, the term of this patent is extended or adjusted under 35 U.S.C. 154(b) by 0 days.

(21) Appl. No.: 18/867,174

(22) PCT Filed: May 17, 2023

(86) PCT No.: PCT/CN2023/094724
§ 371 (c)(1),
(2) Date: Nov. 19, 2024

(87) PCT Pub. No.: WO2023/222020
PCT Pub. Date: Nov. 23, 2023

(65) Prior Publication Data
US 2025/0170871 A1    May 29, 2025

(30) Foreign Application Priority Data
May 19, 2022    (CN) .......................... 202210554177.0

(51) Int. Cl.
*B60H 1/00*    (2006.01)
*B60H 3/06*    (2006.01)

(52) U.S. Cl.
CPC ....... *B60H 1/00564* (2013.01); *B60H 3/0608* (2013.01); *B60H 2001/006* (2013.01); *B60H 2003/065* (2013.01)

(58) Field of Classification Search
CPC .............. B60H 1/00564; B60H 3/0608; B60H 2001/006; B60H 2003/065
See application file for complete search history.

(56) References Cited

U.S. PATENT DOCUMENTS

2007/0189892 A1    8/2007    Oguma
2014/0271166 A1    9/2014    Ghosh et al.

FOREIGN PATENT DOCUMENTS

| CN | 206903947 U | * | 1/2018 |
| CN | 107813674 A |   | 3/2018 |

(Continued)

OTHER PUBLICATIONS

International Search Report issued in corresponding International Application No. PCT/CN2023/094724, dated Aug. 20, 2023 (7 pages).

(Continued)

*Primary Examiner* — Allen R. B. Schult
(74) *Attorney, Agent, or Firm* — Osha Bergman Watanabe & Burton LLP

(57) ABSTRACT

An air intake system (100) for a heating and ventilation air conditioner of a vehicle, comprising an air intake housing (1); a volute (2), a fan assembly (4) being accommodated in the volute (2) and being used for sucking airflow (F) such that the airflow (F) enters the volute (2) through the air intake housing (1); and a filter (3) that is arranged adjacent to an air inlet (21) of the volute (2) and is used for filtering the airflow (F). The volute (2) is provided with a supporting portion (22) protruding from the air inlet (21) by a predetermined height so as to support the filter (3), the supporting portion (22) is connected to the air inlet (21) by means of connecting ribs (23), and corners between the connecting ribs (23) and the air inlet (21) are smooth transition portions.

11 Claims, 4 Drawing Sheets

(56) References Cited

FOREIGN PATENT DOCUMENTS

| | | | |
|---|---|---|---|
| CN | 208169205 U | 11/2018 | |
| CN | 216241004 U | 4/2022 | |
| DE | 112016000796 T5 | 10/2017 | |
| FR | 3072054 B1 | 11/2019 | |
| FR | 3085626 A1 | 3/2020 | |
| JP | 2007218101 A | 8/2007 | |
| JP | 2016150694 A | 8/2016 | |
| KR | 10-2009-0020377 A | 2/2009 | |
| KR | 10-2011-0087084 A | 8/2011 | |
| KR | 10-2015-0030818 A | 3/2015 | |
| KR | 2015030818 A * | 3/2015 | ......... B60H 1/00521 |
| KR | 10-2016-0074715 A | 6/2016 | |
| KR | 10-2016-0075949 A | 6/2016 | |
| WO | 2016-133142 A1 | 8/2016 | |

OTHER PUBLICATIONS

Written Opinion issued in corresponding International Application No. PCT/CN2023/094724, dated Aug. 20, 2023 (6 pages).
Office Action issued by the Japanese Patent Office for corresponding Japanese Patent Application No. 2024-568605, mailed Jul. 4, 2025 (11 pages).

* cited by examiner

AIR INTAKE SYSTEM, AND HEATING AND VENTILATION AIR CONDITIONER AND VEHICLE COMPRISING SAME

TECHNICAL FIELD

The present disclosure relates to an air intake system of a heating and ventilation air conditioner for a vehicle, and a heating and ventilation air conditioner comprising the air intake system, and a vehicle comprising the heating and ventilation air conditioner.

BACKGROUND

Vehicles are generally fitted with a heating and ventilation air conditioner for adjusting the temperature in the vehicle and producing a comfortable environment in the vehicle. A heating and ventilation air conditioner transfers fresh or recirculated air sucked in by an air intake system to a heat exchanger, and then supplies the air to the interior of the vehicle, so as to cool or heat the interior of the vehicle. To achieve compactness and reduce installation volume, an air inlet structure of the heating and ventilation air conditioner has become increasingly small; however, the amount of intake air required is still high, and air pressure at the air inlet has also therefore become increasingly high. In the air inlet structure, a filter is arranged above a fan, so as to filter air entering the interior of the vehicle. To prevent the filter from sinking down and contacting the fan under high air pressure, it is necessary to arrange a filter support structure in the air inlet structure. However, this type of filter support structure disturbs the airflow entering from the air inlet, generating a high speed airflow that impacts blades of the fan, hence generating noise, the frequency of which is a blade pass frequency (BPF), and hereinafter this noise is called BPF noise. BPF is directly proportional to the number of blades and rotation speed of a fan assembly. In a heating and ventilation air conditioner for a vehicle, a typical value of BPF is close to 2 kHz, and the pitch of BPF noise therefore resembles a high-frequency whistle, potentially repulsive to the driver and passengers of the vehicle, negatively affecting the comfort of the vehicle. Known methods for suppressing BPF noise all target the air intake systems which have not been provided with a filter support structure, and are not suitable for an air intake system that comprises a filter support structure.

Therefore, there is a need for a heating and ventilation air conditioner air intake system that is able to support a filter by means of a filter support structure and that is also able to effectively suppress BPF noise.

SUMMARY OF THE INVENTION

An object of the present disclosure lies in proposing an air intake system of a heating and ventilation air conditioner for a vehicle to solve the abovementioned technical problem, which is not only able to support a filter by means of a filter support structure, but is also able to effectively suppress BPF noise generated during operation of the heating and ventilation air conditioner.

An air intake system of a heating and ventilation air conditioner for a vehicle according to the present disclosure comprises: an air intake housing; a volute, with a fan assembly accommodated in the volute, used for sucking in an airflow to cause the airflow to enter the volute via the air intake housing; and a filter, which is arranged adjacent to an air inlet of the volute, and is used for filtering the airflow. The volute is provided with a support part that protrudes by a predetermined height from the air inlet so as to support the filter, and the support part is connected to the air inlet by means of a connecting rib. A corner part between the connecting rib and the air inlet is a smooth transition part, so as to diminish disturbance to the airflow by the corner part.

Thus, the air intake system of the heating and ventilation air conditioner according to the present disclosure may support the filter by means of the support part, preventing the filter from sinking down into the volute and contacting the fan. In addition, the smooth transition part diminishing disturbance to the airflow may also suppress BPF noise generated during operation of the heating and ventilation air conditioner.

The air intake system of the heating and ventilation air conditioner for a vehicle according to the present disclosure may further have one or more of the following features, individually or in combination.

According to an embodiment of the present disclosure, the fan assembly comprises multiple blades, top parts of the blades face the air inlet, and the smooth transition part is able to reduce a flow speed and/or flow rate of some airflow impacting the top parts of the blades in the airflow. Since BPF noise is generated by a high speed airflow impacting the top parts of the fan blades, reducing the flow speed and/or flow rate of the airflow impacting the top parts of the blades is able to effectively suppress or even eliminate the BPF noise.

According to an embodiment of the present disclosure, the support part has an annular structure. With an internal area surrounded by the support part the same, this type of annular structure is able to reduce the perimeter of the support part, reducing obstruction to an air intake airflow by the support part.

According to an embodiment of the present disclosure, a contour of the annular structure is located at an inner side of a contour of the air inlet. A portion of the filter that is located inside the contour of the air inlet bears the greatest air pressure, and is furthest from the frame of the filter, and therefore is the portion that caves in most easily. Such an arrangement of the annular structure of the support part enables same to effectively support the abovementioned portion that most easily caves in.

According to an embodiment of the present disclosure, an edge of the air inlet is provided with a curled side that extends inward and in a downstream direction of the airflow, and the connecting rib is connected to the curled side. This type of curled side arranged at the air inlet edge is also able to diminish disturbance to the air intake airflow by the air inlet edge, and provides support to the connecting rib.

According to an embodiment of the present disclosure, the connecting rib is connected to an upper edge portion of the curled side. The position where the connecting rib is connected to the curled side affects the BPF noise suppression effect thereof. In particular, when the connecting rib is connected to an upper edge portion of the curled side, the BPF noise suppression effect is best, and BPF noise may even be basically eliminated.

According to an embodiment of the present disclosure, the smooth transition part is a round corner.

According to an embodiment of the present disclosure, the radius of the round corner is 5-15 mm.

According to an embodiment of the present disclosure, the connecting rib comprises multiple connecting ribs that are evenly distributed in a circumferential direction. As an example, the connecting rib comprises three connecting ribs that are evenly distributed in a circumferential direction.

According to an embodiment of the present disclosure, the connecting rib becomes gradually larger from the support part toward the air inlet.

According to an embodiment of the present disclosure, the volute comprises an upper volute and a lower volute, and the support part is arranged on the upper volute. Dividing the volute into an upper volute and a lower volute means that the volute is easily formed by molding.

The present disclosure further provides a heating and ventilation air conditioner for a vehicle, the heating and ventilation air conditioner comprising the air intake system described above.

The present disclosure further provides a vehicle, comprising the heating and ventilation air conditioner mentioned above.

BRIEF DESCRIPTION OF THE DRAWINGS

The foregoing and other features and advantages of the present disclosure will become more apparent from the following detailed description of exemplary embodiments with reference to the accompanying drawings, and the description and the accompanying drawings are for illustrative purposes only and are not intended to limit the scope of the present disclosure in any way. The drawings below have not been drawn by meticulously reducing or enlarging actual dimensions in equal proportion, but focus on showing the substance of the present disclosure. In the figures.

In all the drawings, identical or similar components are indicated by identical reference numerals.

DETAILED DESCRIPTION

Figure 1:
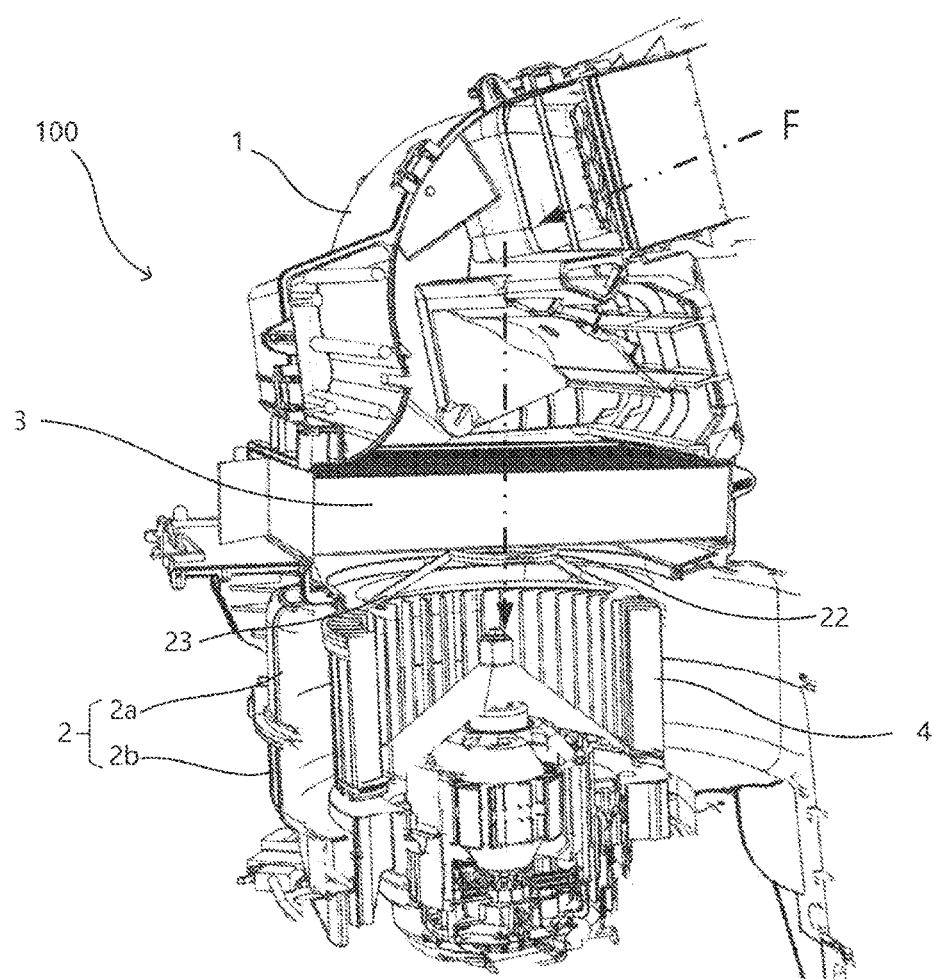
FIG. 1 shows a sectional view of an air intake system of a heating and ventilation air conditioner for a vehicle.

To clarify the objective, technical solutions and advantages of embodiments of the present disclosure, the technical solutions of the embodiments of the present disclosure are described clearly and completely below in conjunction with the drawings of the embodiments of the present disclosure. Obviously, the described embodiments are some rather than all of the embodiments of the present disclosure.

Unless defined otherwise, the technical or scientific terms used herein shall have the common meanings as understood by those of ordinary skill in the field to which the present disclosure belongs. "One", "a" or "said" and similar words used in the description and claims of the patent application of the present disclosure do not indicate a quantity limit, but mean that there is at least one. Words such as "comprise" or "include" mean that the element or object appearing before the word includes the elements or objects and equivalents thereof listed after the word but does not exclude other elements or objects. Although expressions such as "first" and "second" are used to describe various elements of the present disclosure, they are only intended to distinguish one component from another, rather than defining the sequence or importance of the corresponding elements. Without departing from the scope of the present disclosure, "first element" may be written as "second element", and, similarly, "second element" may be written as "first element".

In addition, orientational or positional relationships indicated by the terms "up", "down", "left", "right", "inner", "outer", etc. mentioned herein are based on orientational or positional relationships shown in the drawings, or are orientational or positional relationships for usual placement of the disclosed product when used, or are orientational or positional relationships usually understood by those skilled in the art; and are merely intended to facilitate and simplify the description of the present disclosure, rather than indicating or implying that the apparatus or element referred to must have a specific orientation or be constructed and operated in a specific orientation, and therefore should not be construed as limiting the present disclosure.

FIG. 1 shows a sectional view of an air intake system 100 of a heating and ventilation air conditioner for a vehicle. As shown in FIG. 1, the air intake system 100 includes an air intake housing 1, a volute 2 and a filter 3, and a fan assembly 4 that is accommodated in the volute 2. The volute 2 is composed of an upper volute 2a and a lower volute 2b that are connected together. The fan assembly 4 is used for sucking in an airflow F, to cause the airflow F to enter the volute 2 via the air intake housing 1. The fan assembly 4 comprises multiple blades 41 that are arranged evenly in a circumferential direction near a wall of the volute 2, and top parts of the blades 41 face an air inlet 21 of the volute 2. The fan assembly 4 is driven to rotate by an electric motor that is arranged below it, so as to suck in the airflow F. The blades 41 receive air that enters through the air inlet 21, and centrifugally accelerate the air to leave the volute 2 and enter a heat exchanger of the heating and ventilation air conditioner that is arranged downstream of the airflow F, so as to perform heating or cooling.

The filter 3 is arranged adjacent to the air inlet 21 of the volute 2, and is used for filtering the airflow F, removing pollutants in the airflow, such as inhalable particles, such that a driver and passengers of the vehicle obtain clean air in the vehicle. Under the effect of pressure of the airflow F at the air inlet 21, a screen of the filter 3 sinks downward, with a hazard of contacting the fan assembly 4. To avoid this situation, the filter 3 is supported by a support part 22 that is arranged on the volute 2.

Figure 2:
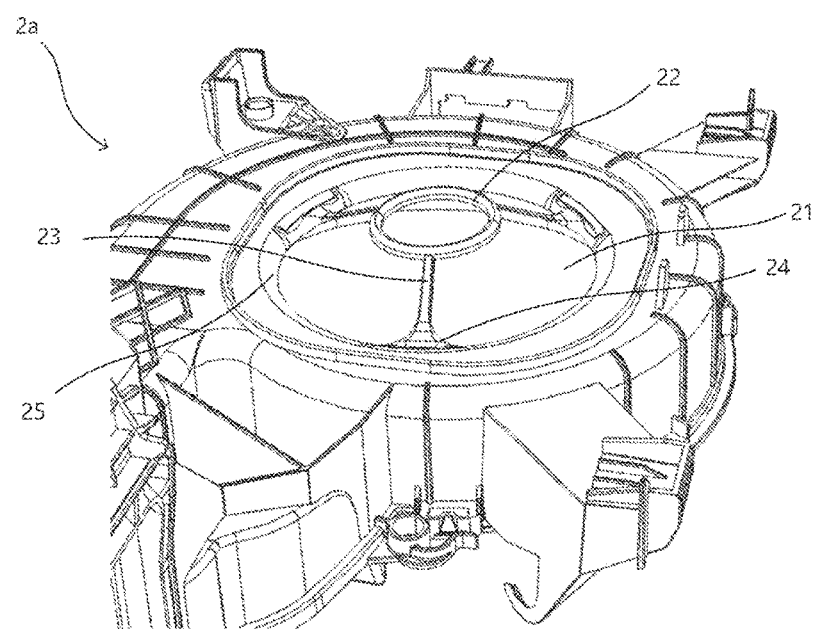
FIG. 2 shows a perspective view of an upper volute of a volute.

Referring to FIG. 2, the support part 22 is connected to the air inlet 21 by means of three connecting ribs 23 that are distributed evenly in a circumferential direction. It may be envisaged that the number of connecting ribs 23 may be adjusted according to requirements. The connecting ribs 23 extend inward and upward from the air inlet 21, such that the support part 22 is arranged inside the contour of the air inlet 21 and protrudes from the air inlet 21 by a certain height. The support part 22 that is inside the contour of the air inlet 21 may directly support a portion of the screen of the filter 3 that bears the greatest pressure. The height of the support part 22 protruding from the air inlet 21 may be preset, such that the screen of the filter 3 does not contact the support part 22 when not bearing the pressure of the airflow F, and is only supported by the support part 22 when bearing the pressure of the airflow F.

As shown in FIG. 1, the support part 22 and the connecting ribs 23 are located inside an air intake channel of the airflow F, and therefore disturb the airflow F. In particular, the support part 22 has an annular structure, and accordingly matches three connecting ribs distributed evenly in a circumferential direction, and may have a comparatively short circumference, reducing obstruction thereof to the airflow F.

In addition, the annular structure of the support part 22 has a smooth surface, reducing disturbance to the airflow F. The connecting ribs 23 have a shape that becomes gradually larger from the support part 22 toward the air inlet 21. Similarly, the gradually enlarging shape of the connecting ribs 23 is also smooth, without portions that increase disturbance to the airflow F such as steplike parts.

In particular, corner parts are formed between the connecting rib 23 and the air inlet 21, and the corner parts are near the fan assembly 4. When provided with a relatively pointed top end, this corner part has an extremely strong turbulence effect on the airflow flowing by, and greatly increases the flow speed and flow rate of some of the airflow that directly impacts the top parts of the blades 41 of the fan assembly 4, generating stronger BPF noise.

Figure 3:
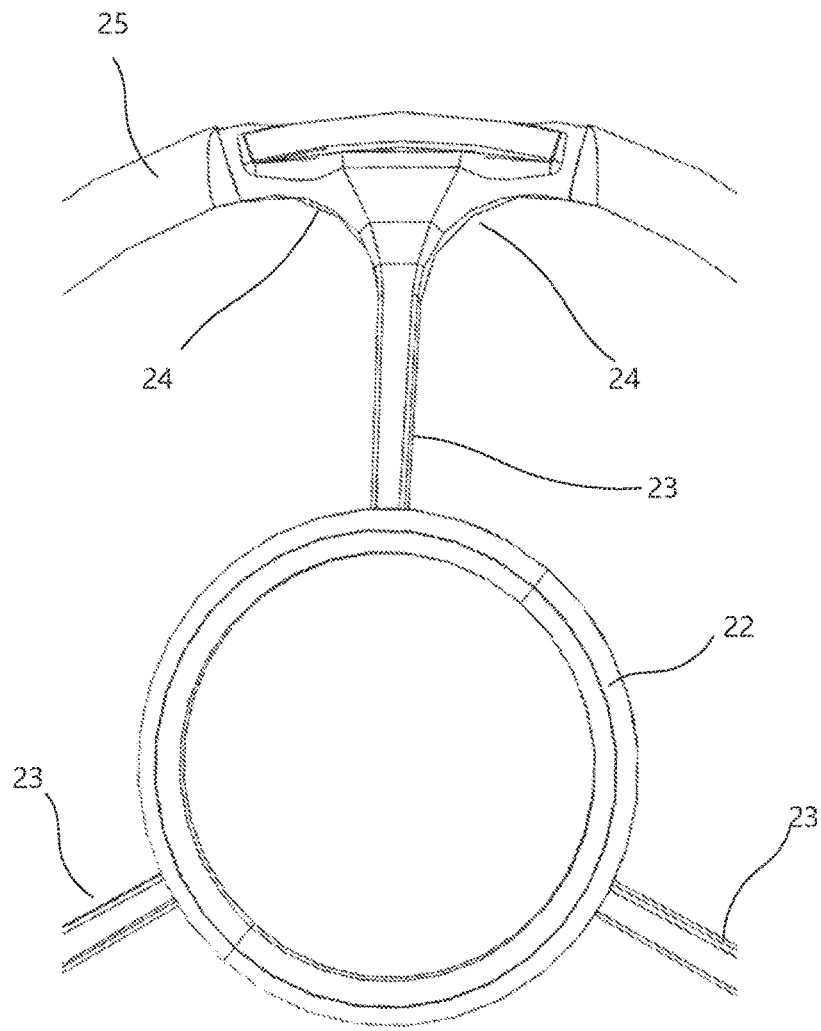
FIG. 3 shows an enlarged top view of a portion of an upper volute.

To suppress such BPF noise, the corner part between the connecting rib 23 and the air inlet 21 of the air intake system 100 according to the present disclosure is constructed as a smooth transition part 24. FIG. 3 shows smooth transition parts 24 formed with round corners. It may be envisaged that the smooth transition part 24 also may have another suitable shape. This type of smooth transition part 24 is able to diminish disturbance to the airflow F by the corner parts, reducing the flow speed and/or flow rate of the airflow impacting the top parts of the blades 41, thereby suppressing or even eliminating the BPF noise.

The dimensions of the smooth transition part 24 are important parameters for the effect of suppressing BPF noise. The greater the dimensions of the smooth transition part 24, the better the effect thereof of suppressing BPF noise, but with the result that the overall noise of the air intake system also increases. Therefore, a smooth transition part 24 of suitable dimensions must be chosen, such that the transition parts are able to suppress BPF noise without increasing, or at least without noticeably increasing, the overall noise of the air intake system. Regarding a smooth transition part 24 that is formed with a round corner, suitable dimensions for the smooth transition part 24 are a round corner radius of 5-15 mm, preferably 5-10 mm. Smooth transition parts 24 with such dimensions are able to basically eliminate BPF noise without increasing overall noise.

The connection positions of the connecting rib 23 to the air inlet 21, that is, the positions of the smooth transition parts 24, are another factor that affects the BPF noise suppression effect. Referring to FIGS. 2 and 3, an edge of the air inlet 21 is provided with a curled side 25 that extends inward and in a downstream direction of the airflow F, and the connecting rib 23 is connected to the air inlet 21 at this curled side 25. Specifically, the connecting rib 23 is connected to an upper edge portion of the curled side 25; that is, the smooth transition part 24 is arranged on an upper edge portion of the curled side 25. This type of connection position is especially advantageous; it is able to achieve the best BPF noise suppression effect, and even may basically eliminate BPF noise. It should be understood that the connecting ribs 23 may also be connected to the middle or a lower edge portion of the curled side 25; that is, the smooth transition part 24 is arranged at the middle or the lower edge portion of the curled side 25. This type of connection position is also able to achieve an acceptable BPF noise suppression effect. In addition, the curled side 25 at the edge of the air inlet 21 also diminishes disturbance to the airflow F by the edge of the air inlet 21.

Figure 4A:
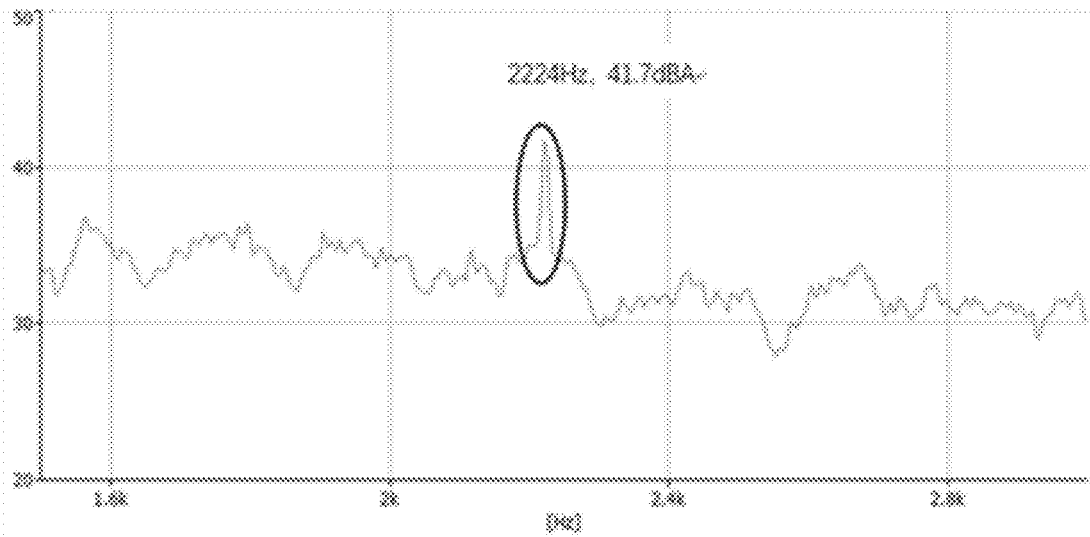
FIG. 4A shows a frequency spectrum graph of noise of an air intake system without smooth transition parts arranged between connecting ribs and an air inlet.
Figure 4B:
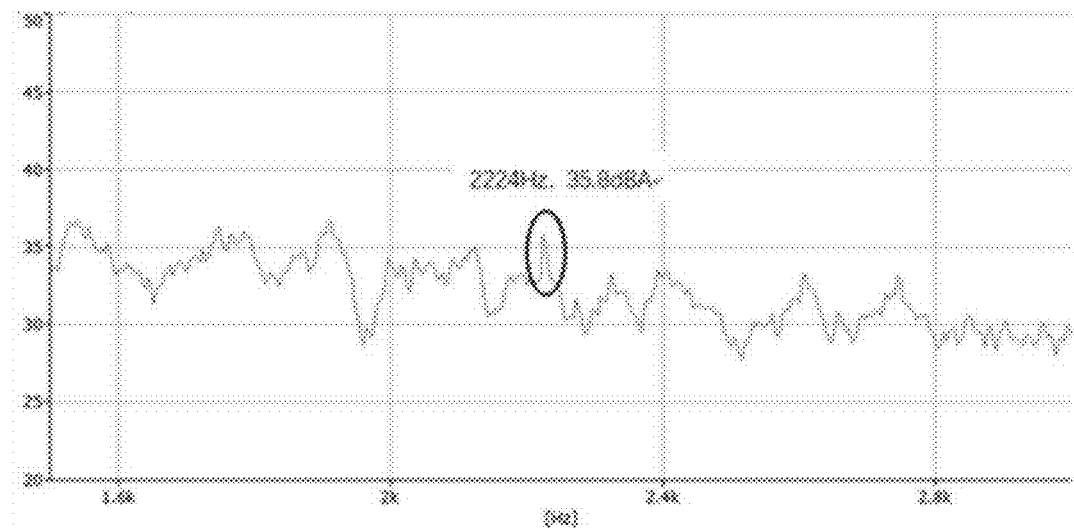
FIG. 4B shows a frequency spectrum graph of noise of an air intake system with smooth transition parts arranged between connecting ribs and an air inlet.

FIG. 4A shows a frequency spectrum graph of noise of an air intake system that has a support part and support ribs similar to in FIGS. 1-3, but without smooth transition parts arranged between connecting ribs and an air inlet; the horizontal axis indicates frequency of noise, and the vertical axis indicates magnitude of noise. In FIG. 4A, it can be seen that the noise frequency spectrum has a clear peak at a BPF of 2224 Hz; that is, the air intake system generates BPF noise, and the magnitude is about 41.7 dBA. In addition, the overall magnitude of noise shown in FIG. 4A is about 62.3 dBA. FIG. 4B shows a frequency spectrum graph of noise of an air intake system but with smooth transition parts with a round corner radius of 7 mm arranged between connecting ribs and an air inlet. In FIG. 4B, it can be seen that the magnitude of noise is 35.8 dBA at the BPF of 2224 Hz, which basically resembles background noise. The smooth transition parts substantially suppress BPF noise, reducing it by 5.9 dBA. In addition, the overall magnitude of noise shown in FIG. 4B is about 62.6 dBA, which is a small change compared to FIG. 4A. Therefore, the smooth transition parts between the connecting ribs and air inlet suppress BPF noise of the air intake system, and imperceptibly increase the overall noise of the air intake system.

It should be understood that the structures described above and shown in the drawings are only examples of the present disclosure, which may be replaced by other structures exhibiting the same or similar functions for obtaining the desired final result. In addition, it should be understood that the embodiment described above and shown in the drawings should be deemed to merely constitute a non-restrictive example of the present disclosure, and that it may be modified in various ways within the scope defined by the patent claims.

What is claimed is:

1. An air intake system of a heating and ventilation air conditioner for a vehicle, the air intake system comprising:
   an air intake housing;
   a volute, with a fan assembly accommodated in the volute, used for sucking in an airflow to cause the airflow to enter the volute via the air intake housing; and
   a filter, which is arranged adjacent to an air inlet of the volute, and is used for filtering the airflow,
   wherein the volute is provided with a support part that protrudes by a predetermined height from the air inlet so as to support the filter,
   wherein the support part comprises an annular structure and is connected to the air inlet by means of a connecting rib,
   wherein a corner part between the connecting rib and the air inlet is a smooth transition part, so as to diminish disturbance to the airflow by the corner part, and
   wherein an edge of the air inlet comprises a curled side that extends inward and in a downstream direction of the airflow, and the connecting rib is connected to the curled side.

2. The air intake system as claimed in claim 1,
   wherein the fan assembly comprises multiple blades, and top parts of the blades face the air inlet, and
   wherein the smooth transition part is able to reduce a flow speed and/or flow rate of some airflow impacting the top parts of the blades in the airflow.

3. The air intake system as claimed in claim 1, wherein a contour of the annular structure is located at an inner side of a contour of the air inlet.

4. The air intake system as claimed in claim 1, wherein the connecting rib is connected to an upper edge portion of the curled side.

5. The air intake system as claimed in claim 1, wherein a smooth transition portion is a round corner.

6. The air intake system as claimed in claim 5, wherein a radius of the round corner is 5-15 mm.

7. The air intake system as claimed in claim 1, wherein the connecting rib comprises multiple connecting ribs that are evenly distributed in a circumferential direction.

8. The air intake system as claimed in claim 1, wherein the connecting rib becomes gradually larger from the support part toward the air inlet.

9. The air intake system as claimed in claim 1, wherein the volute comprises an upper volute and a lower volute, and the support part is arranged on the upper volute.

10. A heating and ventilation air conditioner for a vehicle, the heating and ventilation air conditioner comprises the air intake system as claimed in claim 1.

11. A vehicle comprises the heating and ventilation air conditioner as claimed in claim 10.

* * * * *